(12) United States Patent
Nakaike et al.

(10) Patent No.: US 8,555,270 B2
(45) Date of Patent: Oct. 8, 2013

(54) PROFILE-BASED GLOBAL LIVE-RANGE SPLITTING

(75) Inventors: Takuya Nakaike, Yokohama (JP);
Tatsushi Inagaki, Yokohama (JP);
Hideaki Komatsu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1678 days.

(21) Appl. No.: 11/380,833

(22) Filed: Apr. 28, 2006

(65) Prior Publication Data

US 2007/0256066 A1    Nov. 1, 2007

(51) Int. Cl.
*G06F 9/45* (2006.01)
(52) U.S. Cl.
USPC .......................................... 717/157; 717/158
(58) Field of Classification Search
USPC .................................................. 717/157, 158
See application file for complete search history.

(56) References Cited

U.S. PATENT DOCUMENTS 7,240,344 B2 *    7/2007    Tatge et al. .................... 717/159

OTHER PUBLICATIONS

Hansoo Kim, "Region-based Register Allocation for EPIC Architectures", Jan. 2001, pp. 62-110.*
David Sehr et al., "Languages and Compilers for Parallel Computing", Aug. 1996, Springer, p. 255.*
Preston Briggs et al., "Agressive Live Range Splitting", 1991, Rice University, pp. 1-11.*
Z/Architectures: Principles of Operation, May 2004, Chapter 7.
Park et al., "Optimistic Register Coalescing", ACM Transactions on Programming Languages and Systems, vol. 26, No. 4, Jul. 2004, pp. 735-765.
Kim, "Region-based Register Allocation for EPIC Architectures", Jan. 2001, pp. 62-98.
Cooper et al., "Live Range Splitting in a Graph Coloring Register Allocator", Dec. 1997.
Bergner et al., "Spill Code Minimization Via Interference Region Spilling", ACM, 1997, pp. 287-295.
George et al., "Iterated Register Coalescing", ACM Transactions on Programming Languages and Systems, vol. 18, No. 4, May 1996, pp. 300-324.
Kurlander et al., "Zero-cost Range Splitting", ACM 1994, pp. 257-265.
Kolte et al., "Load/Store Range Analysis for Global Register Allocation", ACM 1993, pp. 268-277.
Briggs, "Aggressive Live Range Splitting", Apr. 1992, Chapter 6.
Cytron et al., "Efficiently Computing Static Single Assignment Form and the Control Dependence Graph", Mar. 1991, pp. 1-52.
Choi et al., "Automatic Construction of Sparse Data Flow Evaluation Graphs", ACM 1990, pp. 55-66.
Briggs et al., "Coloring Heuristics for Register Allocation", ACM 1989, pp. 275-284.
Chaitin, "Register Allocation & Spilling Via Graph Coloring", ACM 1982, pp. 98-105.

* cited by examiner

*Primary Examiner* — Wei Zhen
*Assistant Examiner* — Lanny Ung
(74) *Attorney, Agent, or Firm* — Lieberman & Brandsdorfer, LLC

(57) ABSTRACT

A method and system are provided for splitting a live-range of a variable in frequently executed regions of program instructions. The live-range of a variable is split into multiple sub-ranges, each of which can be assigned to a different register or spilled into memory. The amount of spill code is reduced in frequently used regions of code by coalescing the live ranges based on profile information obtained after splitting the live ranges at every join and fork point in a control flow graph.

6 Claims, 8 Drawing Sheets

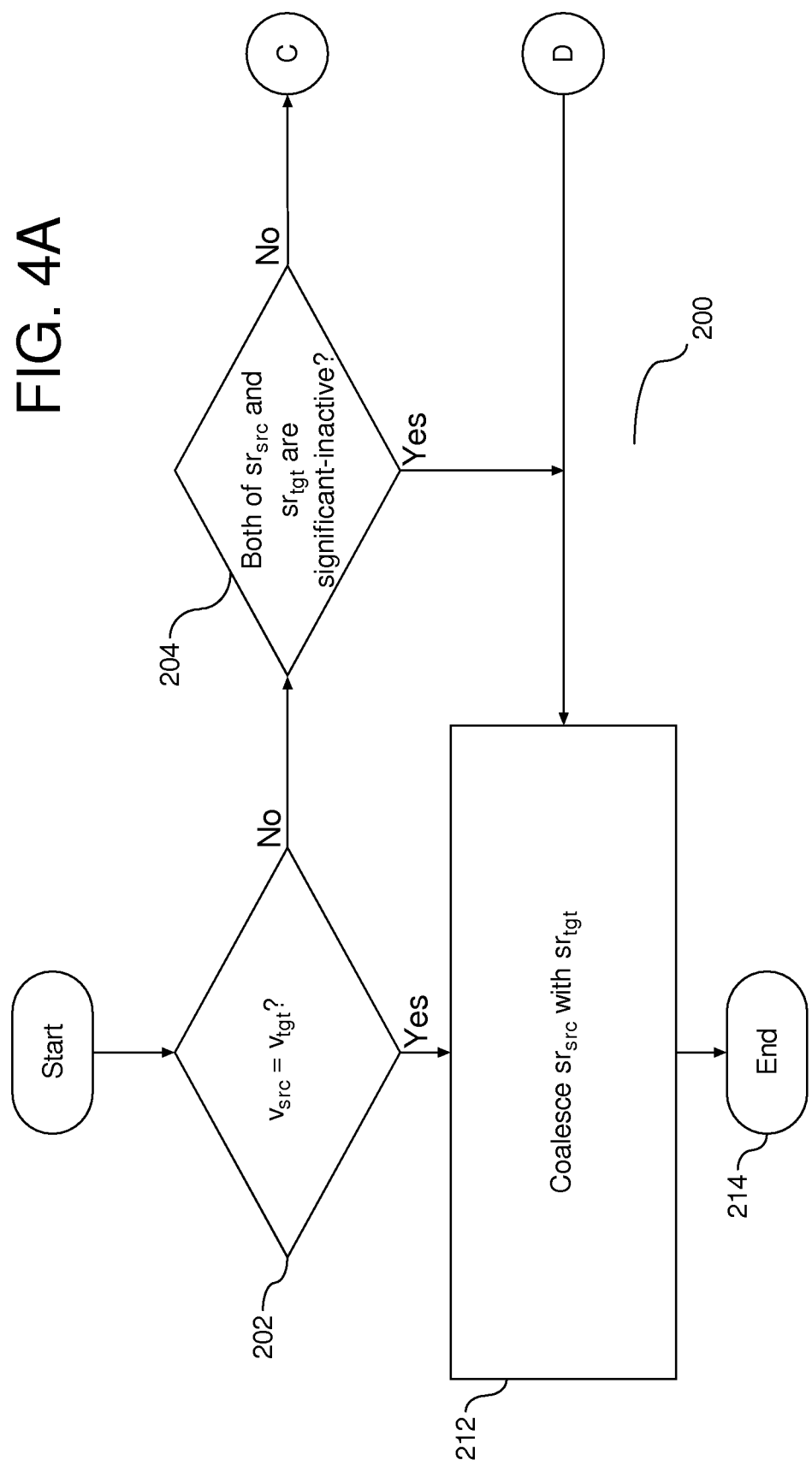

Table 1. Coalescing Rules

|  | Insignificant - inactive | Insignificant - active | Significant - inactive | Significant - active |
|---|---|---|---|---|
| Insignificant - inactive | - | - | Rule 3 | Rule 3 |
| Insignificant - active | - | - | Rule 2 | Rule 2 |
| Significant - inactive | Rule 3 | Rule 2 | Rule 1 | Rule 3 |
| Significant - active | Rule 3 | Rule 2 | Rule 3 | Rule 3 |

FIG. 5

PROFILE-BASED GLOBAL LIVE-RANGE SPLITTING

BACKGROUND OF THE INVENTION

1. Technical Field

This invention relates to optimization of a compiler. More specifically, the invention relates to reducing the amount of spill code for frequently executed regions of program code.

2. Description of the Prior Art

A control flow graph is a directed graph that represents the control flow of program code. The control flow graph includes a plurality of nodes and a directed edge. Each node represents a straight line sequence of code that can be entered only at the beginning and exited only at the end, i.e. a basic block. A directed edge is a control flow from one basic block to another basic block. FIG. 1 is a prior art diagram (1) of a basic control flow graph. As shown there are a plurality of basic blocks. The first basic block (12) introduces and defines variables a and b. From the first basic block, there is a decision point that enables the flow to proceed to one of two subsequent blocks (14) and (16). Separate edges (22) and (24) represent the control flow from the first basic block (12) to one of the two subsequent blocks (14) and (16). The edges (22) and (24) emanating from the first basic block (12) define a fork point, which is a point from which multiple edges branch in the control flow graph. Following completion of the instructions at either block (22) or (24) the control flow is directed to a final basic block (18). Again, there are two edges (26) and (28) that join at the final basic block. The point at which edges (26) and (28) join is known as a joint point, which is a point into which multiple edges merge in the control flow graph.

Register allocation is an important phase of compiling computer code. It maps variables to either registers or memory locations in a manner that minimizes the number of accesses to memory during program execution. By assigning frequently accessed variables to hardware registers, the number of memory references is reduced. Programs that utilize variables stored in hardware registers execute faster than programs that utilize variables stored in memory. It is known in the art that processors have a limited number of registers, and programs frequently have more variables than registers. A graph, known as an interference graph is used to assign temporary variables to hardware registers. In an interference graph, a node represents a live range and an edge represents the interference where two live ranges overlap. A live range of a variable is a range between an instruction where the variable is defined and another instruction where the variable is used or not used. This graph is known as an interference graph because the values would interfere with each other if they shared a register. Graph coloring is a prior art technique that assigns colors to the nodes in an interference graph such that neighboring nodes do not share a color, i.e. any two nodes connected by an edge must be colored with different registers. If two variables do not interfere, the same register may be used for both of them, thus reducing the number of registers needed. The same color, i.e. register, cannot be assigned to any two nodes that are connected by an edge.

Spilling is a process of placing a node, i.e. a live range, in memory when any register is not available. Reducing the amount of spill code in frequently executed program regions is critical to achieve high performance. There are different types of spill techniques. One type is known as the spill everywhere technique where an entire live range is placed in memory. However, this technique generates redundant spill code regardless of whether it is in a frequently executed program region. High performance is attained when a live range is placed in a register instead of memory in frequently executed program region. Another approach is to spill some parts of a live range into memory. This technique, starts spilling the live ranges after all the physical registers are used up. However, this technique may not select the optimal parts of live ranges since it does not prioritize the parts of live ranges that are associated with frequently executed program regions. A further approach that takes into account the spill everywhere technique and the partial spilling technique is known as a live-range splitting technique. This technique splits a live range into smaller sub-ranges before assigning any of the nodes to a registers. When a live range x is split into two sub-ranges $x_1$ and $x_2$, a copy is created to move a value from the source variable living in $x_1$ to the target variable living in $x_2$. This approach allows selection of the best sub-range for spilling among the sub-ranges that are split from different live ranges. However, there are limitations with this technique including that each sub-range must have at least one definition or use except for copies, copies might be inserted in hot regions, i.e. frequently executed regions of code, and many copies are sequentially inserted. Accordingly, as explained herein there are limitations associated with the prior art techniques that may increase the amount of interference and degrade coloring results.

Therefore, there is a need for a live-range splitting algorithm that reduces the amount of spill code in frequently executed regions of code.

SUMMARY OF THE INVENTION

This invention comprises a method and system for splitting a live-range.

In one aspect of the invention, a method is provided for minimizing spill code in hot regions during a live-range splitting process. Each live range of a variable is split into multiple sub-ranges on all edges leading to joint points and coming from fork points in a control flow graph. The split of the live ranges takes place before coloring nodes in the graph. During the process of splitting, each sub-range is analyzed based upon traversal of instructions in each basic block of the graph. Thereafter, the sub-ranges are coalesced in frequently executed regions of program code based on profile information and the analysis result of sub-ranges.

In another aspect of the invention, a computer system is provided with a range manager responsible for splitting each live range of a variable into multiple sub-ranges on all edges leading to joint points and coming from fork points in a control flow graph. The manager splits the live range prior to coloring the nodes in the graph. During the split of the live-range, the manager analyzes each created sub-range based upon traversal of instructions in each basic block of the graph and assigns attributes to the sub-range(s). Thereafter, multiple sub-ranges are coalesced in frequently executed regions of program code based on profile information and the assigned attributes.

In yet another aspect of the invention, an article is provided in a computer-readable medium. Instructions in the medium are provided for splitting each live range of a variable into multiple sub-ranges all edges leading to join points and coming from fork points in a control flow graph. The instructions are executed before coloring nodes in the graph. In addition, instructions in the medium are provided for analyzing and assigning attributes to each sub-range based upon traversal of instructions in each basic block of the graph. Instructions are provided in the medium to coalesce sub-ranges in frequently executed regions of code based on profile information and the assigned attributes.

Other features and advantages of this invention will become apparent from the following detailed description of the presently preferred embodiment of the invention, taken in conjunction with the accompanying drawings.

BRIEF DESCRIPTION OF THE DRAWINGS

FIGS. 4A and 4B are flow charts illustrating sub-range coalescing.

FIG. 5 is a table illustrating the coalescing rules.

DESCRIPTION OF THE PREFERRED EMBODIMENT

Technical Details

Figure 1:
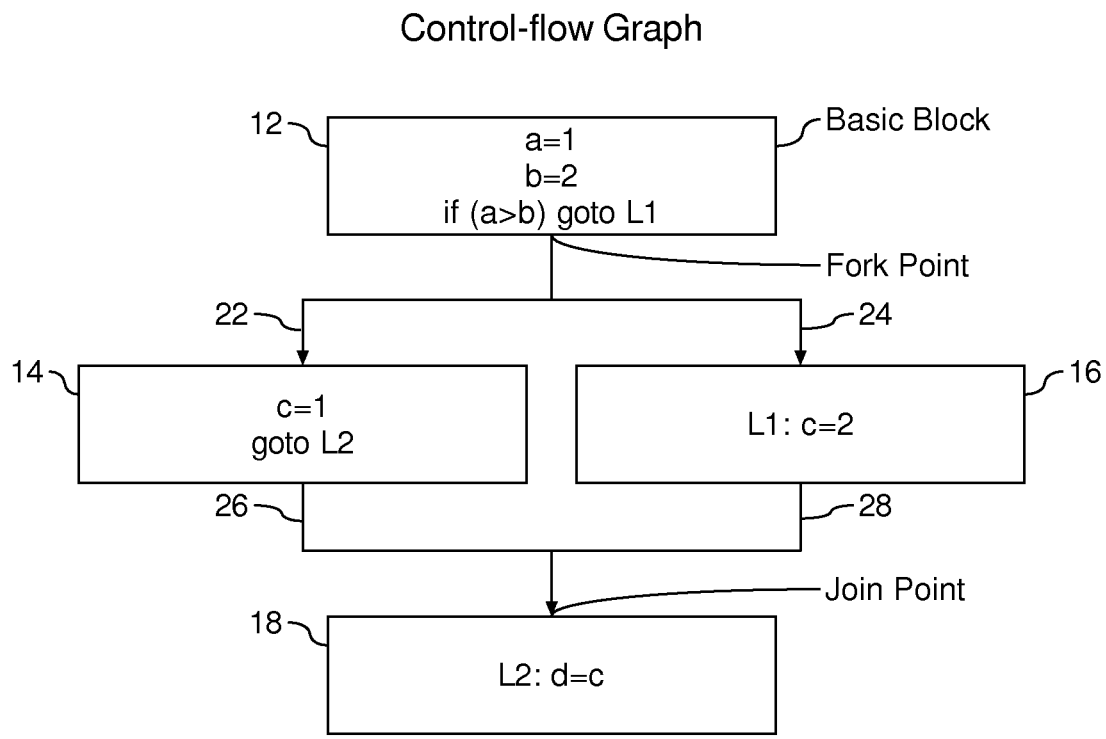
FIG. 1 is a block diagram of a prior art control-flow graph.
Figure 2:
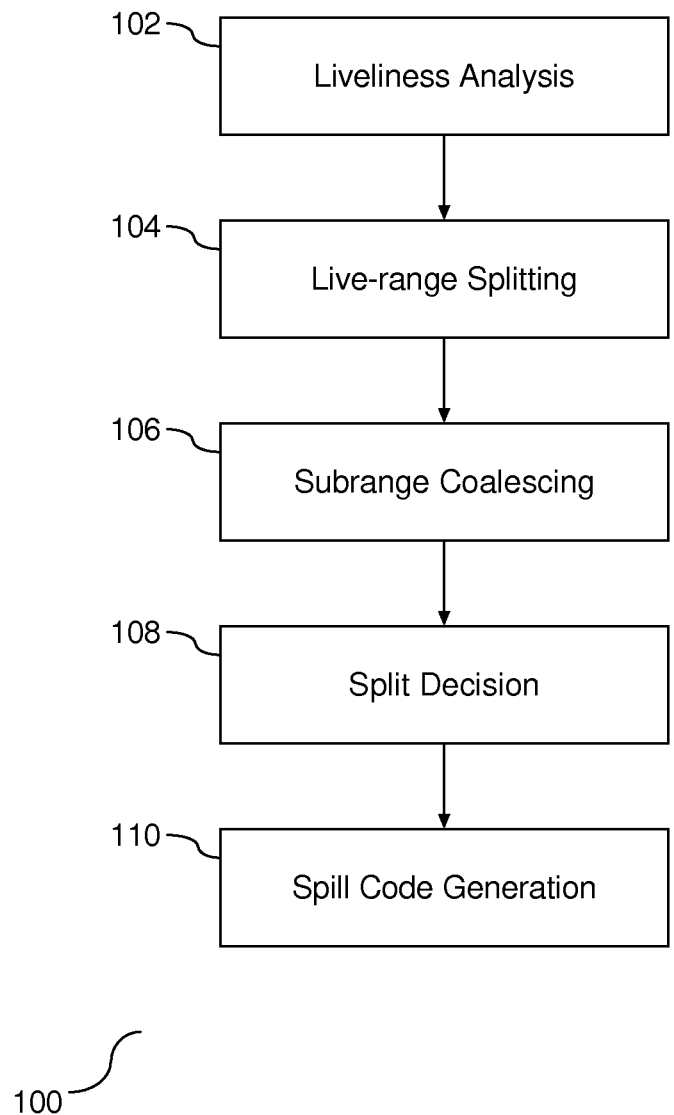
FIG. 2 is a flow chart outlining the primary steps of the live-range splitting technique according to the preferred embodiment of this invention, and is suggested for printing on the first page of the issued patent.

FIG. 2 is a flow chart (100) of a live-range splitting algorithm. The first step of the algorithm entails liveliness analysis (102). In this step, the live range of each variable is analyzed and a unique name is assigned to each live range. A live range of a variable is defined as a range between an instruction where the variable is defined and another instruction where the variable is used or not used. More specifically, the set of variables living at the entry and exit of each basic block in the control-flow graph are analyzed. Following the analysis in step (102), each live range is split into multiple sub-ranges (104). The details of the live-range splitting is shown in FIG. 3 below. The information associated with the live-range splitting is used to coalesce the sub-ranges (106), as shown in detail in FIGS. 4A and 4B below, and to select the sub-ranges to be spilled (108), as shown in detail in FIG. 6 below. Finally, spill code is generated (110) for the sub-ranges selected to be spilled.

Figure 3A:
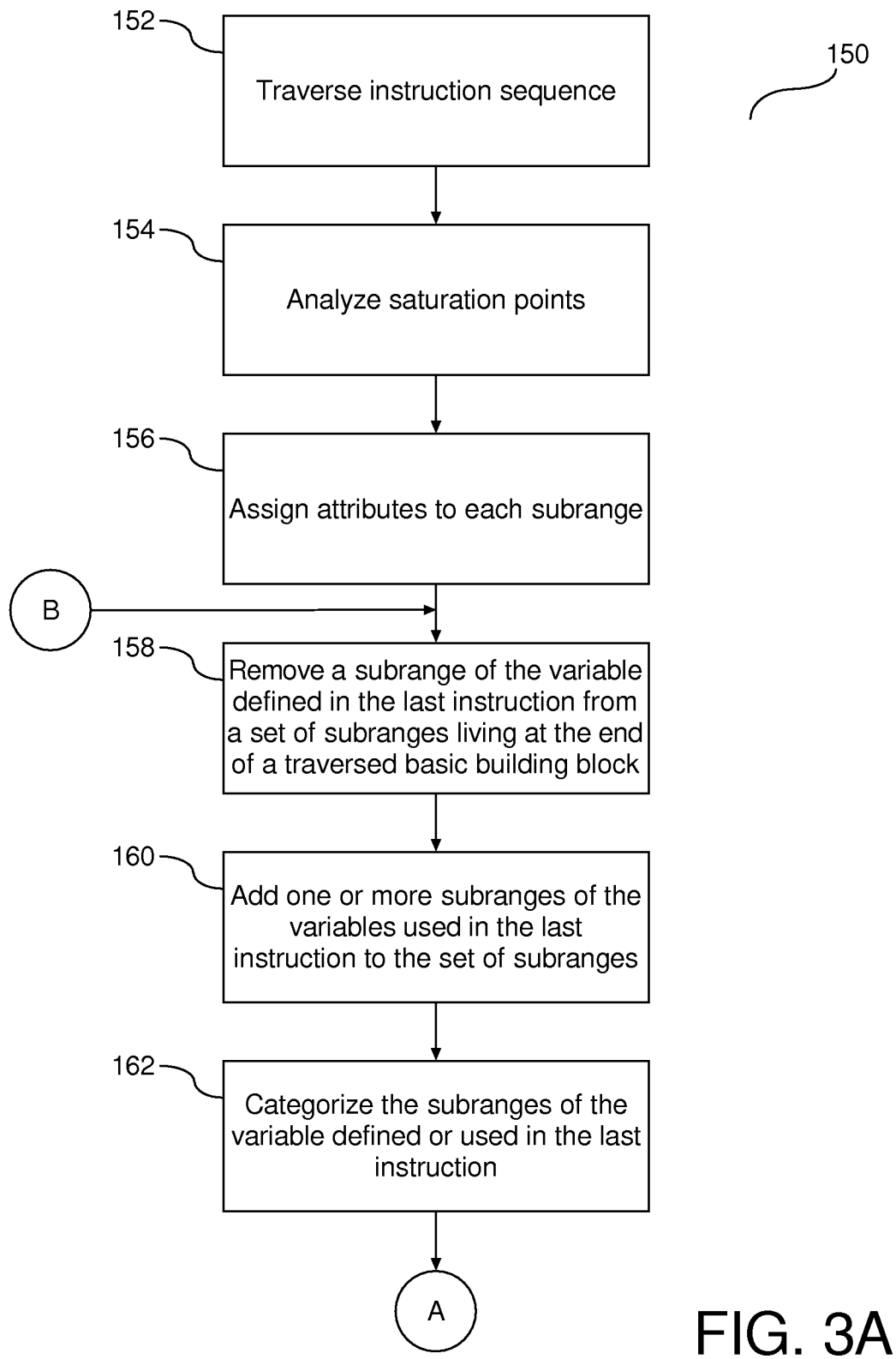
FIGS. 3A and 3B are flow charts illustrating live-range splitting.
Figure 3B:
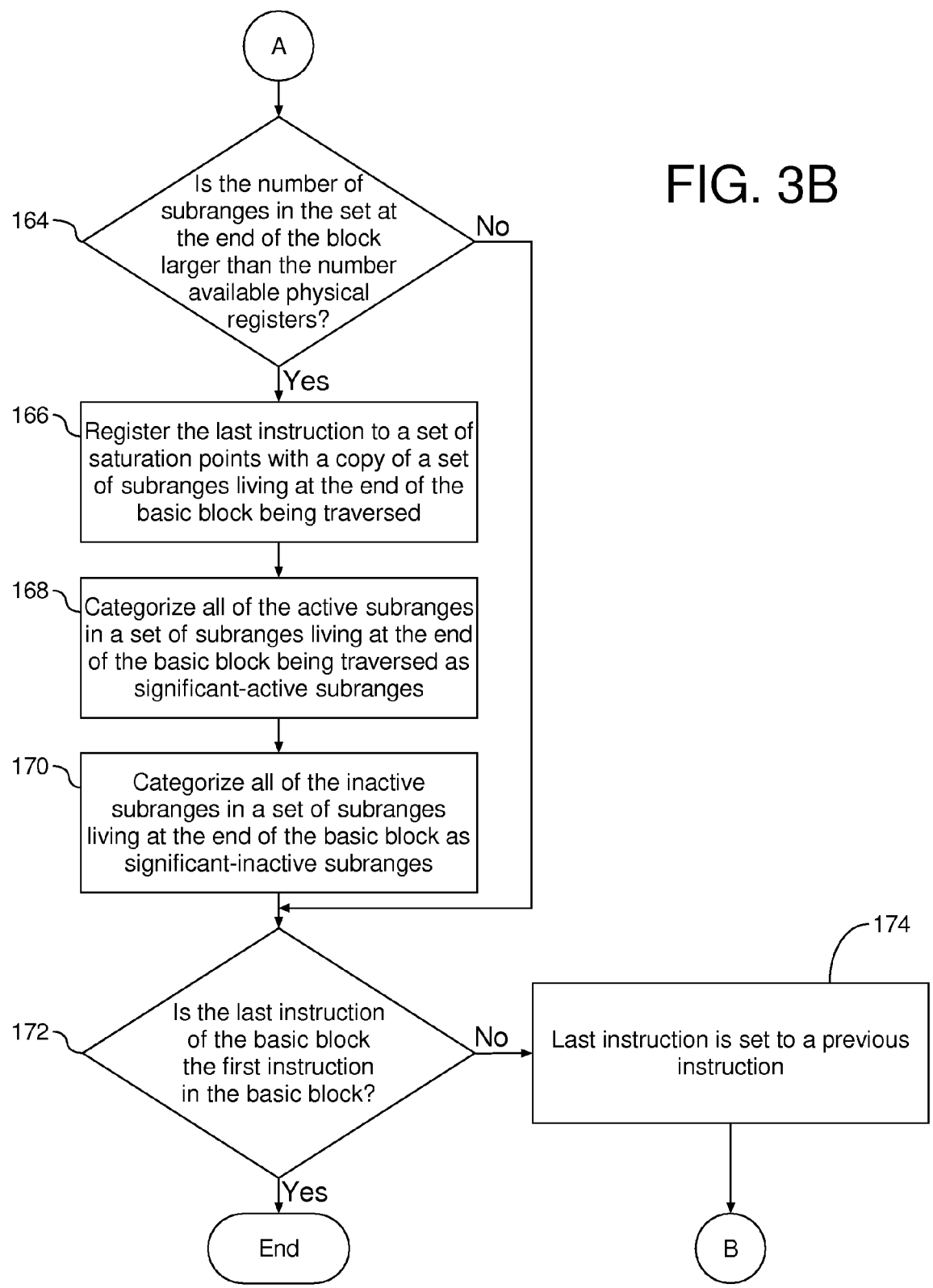

As noted above, FIGS. 3A and 3B are flow chart (150) of a live-ranging splitting algorithm that follows the analysis of the live range. In FIGS. 3A and 3B, each live range is split into multiple sub-ranges by inserting copies to split live ranges on all of the edges leading to the join points or coming from the fork points in the control-flow graph. An inserted copy splits a live range into two sub-ranges $sr_1$ and $sr_2$. The copy has a source variable living in $sr_1$ and has a target variable living in $sr_2$. Live-range splitting processes are known in the art. FIGS. 3A and 3B discussed below outline in detail novel elements of the live-range splitting technique. In one embodiment, the amount of spill code in frequently accessed regions, i.e. hot regions, is minimized by splitting live ranges into sub-ranges prior to coloring. To do this, the live ranges are split on all of the edges leading to the join points or coming from the fork points in the control-flow graph, and the hot regions are coalesced based on profile information and those copies are removed. The removed copies may be converted into the spill code in the hot regions. In order to split the live ranges, the instruction sequence in each basic block is traversed (152). Saturation points, which are defined as the instructions where the number of overlapping live ranges is more than the number of physical registers, whether or not each sub-range has uses or definitions, and whether or not each sub-range extends across the saturation points are analyzed (154). One of two kinds of attributes are assigned to each sub-range (156). The first attribute of the sub-range is defined as either a significant sub-range or an insignificant sub-range. A significant sub-range is a sub-range that extends across at least one saturation point. An insignificant sub-range is a sub-range that does not extend across any saturation points. The second attribute pertains to the definition or use of the sub-range in the form of an active sub-range and an inactive sub-range. An active sub-range is a sub-range that has at least one definition or use, and an inactive sub-range is a sub-range that does not have any definition or use. The first step in splitting a live range is to remove a sub-range of a variable defined by the last instruction of a basic building block from a set of sub-ranges living at the end of the basic block being traversed (158). One or more sub-ranges of the variables used in the last instruction of the basic building block are added to the set of sub-ranges living at the end of the basic block being traversed (160). Thereafter, the sub-ranges of the variables defined or used in the last instruction are categorized into a set of active sub-ranges or a set of significant-active sub-ranges (162). Following step (162), a test is conducted to determine if the number of sub-ranges in the set of sub-ranges living at the end of the basic block being traversed is larger than the number of available physical registers (164). A positive response to the test at step (164) will result in registering the last instruction of the basic block being traversed to a set of saturation points with a copy of a set of sub-ranges living at the end of a basic block being traversed (166). All of the active ranges in the set of sub-ranges living at the end of the basic block being traversed are categorized as significant-active sub-ranges (168). Similarly, all of the inactive sub-ranges in the set of sub-ranges living at the end of the basic block being traversed are categorized as significant-inactive sub-ranges (170). Following step (170) or a negative response to the test at step (164), a test is conducted to determine if the last instruction of the basic block being traversed is the first instruction in the basic block being traversed (172). A negative response to the test at step (172) will result in assigning the instruction previous to the last instruction of the basic block being traversed to be the last instruction of the basic block being traversed (174), followed by a return to step (158). However, a positive response to the test at step (172) will result in completion of the live range splitting process (176). As shown in FIG. 3, the live-range splitting process analyzes the saturation points, whether or not each sub-range has uses or definition, and which sub-ranges extend across the saturation points.

Figure 4B:
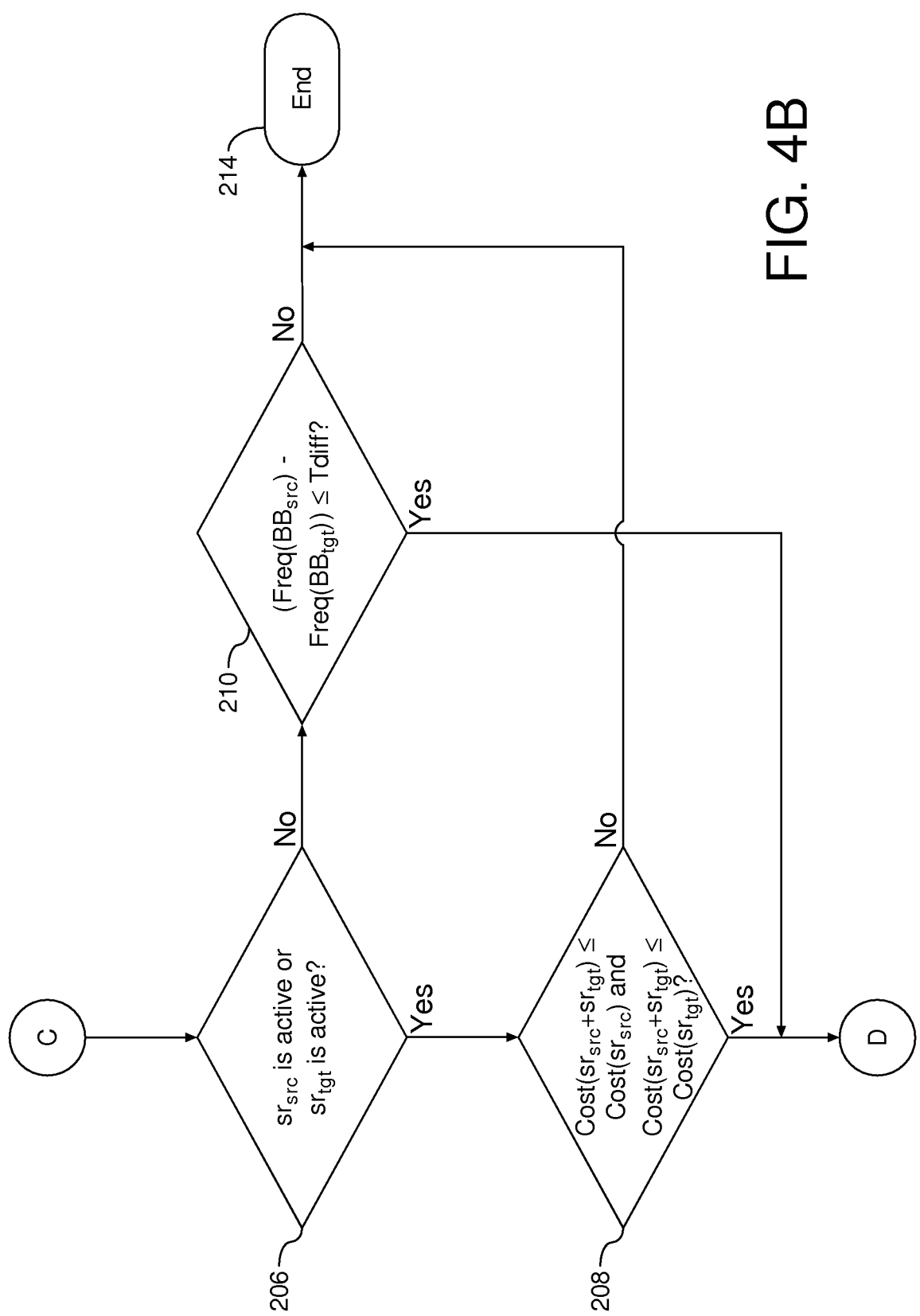

The analysis shown in FIGS. 3A and 3B is used to coalesce and spill the sub-ranges. Following the process of splitting live ranges into smaller sub-ranges, the sub-ranges are coalesced to reduce the amount of spill code in hot regions. FIGS. 4A and 4B are flow charts (200) illustrating the process for coalescing two adjacent sub-ranges. Three coalescing rules are implemented according to the following attributes of the sub-ranges being coalesced: insignificant-inactive, insignificant-active, significant-inactive, and significant-active. The first test determines if a source variable of the splitting copy is equal to a target variable of the splitting copy (202). If the response to the test at step (202) is positive, a sub-range of the source variable of the splitting copy is coalesced with the sub-range of the target variable of the splitting copy (212). If the response to the test at step (202) is negative, a subsequent test based upon the first rule is conducted to determine if both the source variable of the splitting copy and the target variable of the splitting copy are significant inactive (204). In one embodiment, significant inactive means that the sub-range of the variable extends across at least on saturation point and does not have any use or definition. When both of two adjacent sub-ranges are significant-inactive, as demonstrated by a positive response to the test at step (204), the two adjacent sub-ranges are coalesced unconditionally (212). A copy splitting two significant-inactive sub-ranges is the least necessary because significant-inactive sub-ranges are most likely to be spilled without generating any spill code except for the spill code converted from the copy. If these sub-ranges are not coalesced, redundant spill code may be generated at the splitting points. As shown, a positive response will results in a sub-range of the source variable of the splitting copy being coalesced with the sub-range of the target variable of the splitting copy (212). However, a negative response to the test at step (204) will result in another test based upon the second rule to determine if one of the two adjacent sub-ranges is insignificant-active (206). A positive response to the test at step (206) will result in subsequent test to determine if the coalesced sub-range has a lower spill cost than a significant sub-range before it was coalesced (208). When one sub-range is an insignificant-active sub-range and a second adjacent sub-range is a significant sub-range, the two sub-ranges are coalesced if the cost for spilling the coalesced sub-ranges is lower than the cost for spilling the second adjacent sub-range, as shown in the flow chart in the form of a positive response to the test at step (208). An insignificant-active sub-range does not need to be spilled. Coalescing the insignificant-active sub-range with a significant sub-range potentially generates redundant spill code. Such redundant spill code is beneficial if its execution cost is lower than that of the removed copy. In one embodiment, multiple copies of a sub-range can be removed at the same time. Similarly, a negative response to the test at step (206) will result in a subsequent test based upon the third rule to determine if neither of the two adjacent sub-ranges is insignificant-active or one of the two adjacent sub-ranges is not significant-inactive (210). Based upon the parameters of the third rule it is determined if the difference in execution frequencies between the source and destination basic blocks of the splitting edge is within a threshold. In one embodiment, the threshold is defined as half the execution frequency of the source basic blocks if the execution frequency of the source basic blocks is greater than the execution frequency of the delineation basic block, or half the execution frequency of the destination basic blocks if the execution frequency of the destination basic blocks is greater than the execution frequency of the source basic block. A positive response to the test at step (210) will result in a sub-range of the source variable of the splitting copy being coalesced with the sub-range of the target variable of the splitting copy (212). However, a negative response to tests (208) or (210) will end the tests to determine coalescing of the sub-ranges (214).

FIG. 5 is a table (250) outlining application of the three rules used for coalescing adjacent sub-ranges as demonstrated in FIG. 4. As shown, the test for the first rule is shown at step (204) applies when both of two adjacent sub-ranges are significant-inactive. In this case, they are unconditionally coalesced. The test for the second rule as shown at step (206) determines if one of the two adjacent sub-ranges is insignificant-active. As shown, the test for the second rule applies only when one of the two sub-ranges is defined as insignificant-active. In this case the two adjacent sub-ranges are coalesced only if the coalesced sub-range has a lower spill cost than a significant sub-range before it was coalesced. The test for the third rule, as shown at step (210), applies if both of the two adjacent sub-ranges is significant or one of the two adjacent sub-ranges is not significant-inactive. In this case a frequency of use analysis is conducted to determine if the two adjacent sub-ranges should be coalesced. Although there are only three general rules demonstrated to determine optimal coalescing conditions, the invention should not be limited to these rules illustrated. In one embodiment, the rules may be modified or additional or alternative rules may be implemented to determine optimal conditions for coalescing adjacent sub-ranges.

Figure 6:
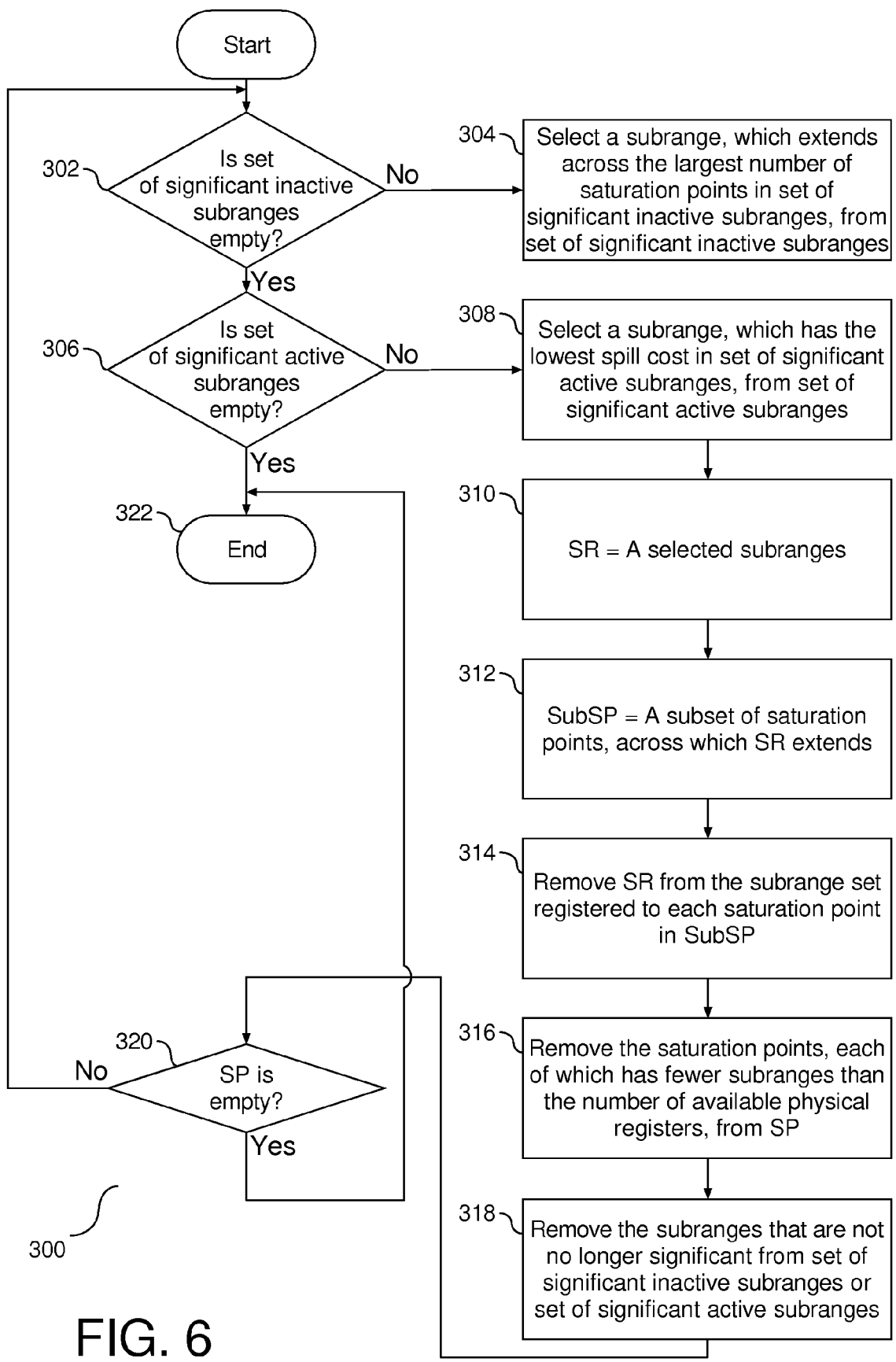
FIG. 6 is a flow chart illustrating spill decision.

Following the process of coalescing sub-ranges as outlined in FIG. 4, a process is initiated for selecting sub-ranges for spilling from significant-inactive or significant-active sub-ranges. FIG. 6 is a flow chart (300) outlining the process for determining which sub-ranges to spill. Initially, a test is conducted to determine if a set of significant-inactive sub-ranges is empty (302). The significant-inactive sub-ranges are the first candidates for spilling because they may waste physical registers without any computation in their sub-range. A negative response to the test at step (302), will result in selecting a sub-range from the set of significant-inactive sub-ranges that extend across the largest number of saturation points in the set of significant-inactive sub-ranges (304). However, a positive response to the test at step (302) will result in a test to determine if a set of significant-active sub-ranges is empty (306). A negative response to the test at step (306) will result in selection of a sub-range from the set of significant-active sub-ranges with the lowest spill cost (308). Following step (308), the variable SR is assigned to the selected sub-range (310), i.e. the sub-range with the determined lowest spill cost from step (308), and the variable SubSP is assigned to a subset of saturation points across which the selected sub-range, SR, extends (312). Thereafter, the selected sub-range (314) is removed from the sub-range set registered to each saturation point in the subset of saturation points, SubSP, each of the saturation points which has fewer sub-ranges than the number of available physical registers is removed from the set of saturation points, SP, (316), and the sub-ranges that are no longer significant in the set of significant-inactive sub-ranges and the set of significant-active sub-ranges are removed from the set of significant-inactive sub-ranges and the set of significant-active sub-ranges (318). Following step (318), a test is conducted to determine if the set of saturation points is empty (320). A negative response to the test at step (320) will result in a return to step (302). However, a positive response to the test at steps (306) or (320) will result in completion of the spill decision process (322). Accordingly, the process outlined herein selects sub-ranges for spilling from significant-inactive or significant-active sub-ranges.

Following the selection of sub-ranges for spilling, spill instructions are generated for the selected sub-ranges through use of a spill everywhere approach. A store instruction is inserted after every definition where a value is written to a variable in each sub-range selected for spilling, and a load instruction is inserted before every use where a value is read from a variable in each sub-range selected for spilling. If the source variable, from which a value is read, of a copy is spilled, the copy is converted into a load to the target variable, to which a value is written. Similarly, if the target variable of a copy is spilled, the copy is converted into a store from the source variable. If the target and source variables of a copy are both spilled, the copy is eliminated. After generating spill code, all the remaining copies are removed.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. With respect to the hardware embodiment, managers and directors may be present to facilitate management of range splitting, profiling, and coalescing.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Advantages Over the Prior Art

Each live range is split into multiple sub-ranges at every join and fork point in the control-flow graph. The sub-ranges are subsequently coalesced in frequently accessed regions based upon profile information associated with each sub-range. This generates the spill code in less frequently accessed blocks in the control flow graph and provides efficient use of registers in frequently accessed blocks in the control flow graph. In addition, some of the sub-ranges are spilled into memory before the coloring phase and no redundant copy between sub-ranges is left to the coloring phase.

Alternative Embodiments

It will be appreciated that, although specific embodiments of the invention have been described herein for purposes of illustration, various modifications may be made without departing from the spirit and scope of the invention. In particular, when spill code is generated a spill area in memory may be allocated to each spilled sub-range. A spill area may be shared among sub-ranges split from a live range because those sub-ranges never overlap. In addition, a spill area can be shared among the sub-ranges split from the original live ranges that do not overlap. To do this a prefix which expresses the name of an original live range is added to the name of each sub-range and the interference graph is built among original live ranges when renaming sub-ranges. It can be determined which spill area can be re-used by correlating the spill area allocated to a sub-range with the name of the sub-range. The interference graph for the original live ranges may be used in the coloring phase to re-use the spill area allocated. Accordingly, the scope of protection of this invention is limited only by the following claims and their equivalents.

We claim:

1. A method for minimizing spill code in hot regions comprising:

splitting each live range of a variable into multiple sub-ranges on all edges leading to joint points and all edges coming from fork points in a control flow graph before coloring nodes in a corresponding interference graph, wherein a portion of sub-ranges is inactive;

profiling each sub-range based upon traversal of a basic building block of said control flow graph;

selecting frequently executed regions of code;

limiting a process of coalescing sub-ranges to said selected frequently executed regions of code based upon profiles thereby removing copies dividing initial live ranges into sub-ranges in said frequently executed regions and absent coalescing in regions other than said frequently executed regions; and selecting a set of sub-ranges in less used regions for spilling into memory, absent spilling any sub-ranges during the coloring phase and absent leaving any redundant sub-ranges to the coloring phase, wherein said sub-ranges are selected initially from those classified as significant-inactive and secondarily from those classified as significant-active.

2. The method of claim 1, wherein the step of splitting sub-ranges includes creating two adjacent sub-ranges which are split on an edge between two basic building blocks that have similar execution frequencies.

3. The method of claim 1, wherein the step of splitting each live range of a variable includes analyzing a sub-range by assigning a category to said sub-ranges based upon activity of said sub-range across a saturation point, wherein said category is selected from a group consisting of: inactive, active, significant inactive, and significant active.

4. The method of claim 1, wherein the step of limiting coalescing of sub-ranges includes: unconditionally coalescing two adjacent sub-ranges categorized as significant-inactive, coalescing two adjacent sub-ranges based upon cost analysis when one of said sub-ranges is categorized as insignificant-inactive, and coalescing two adjacent sub-ranges based upon execution frequency analysis when neither of said sub-ranges is categorized as insignificant-active or when one of said sub-ranges is categorized as other than significant-inactive.

5. A method for minimizing spill code in hot regions comprising:

splitting each live range of a variable into multiple sub-ranges on all edges leading to joint points and all edges coming from fork points in a control flow graph before coloring nodes in a corresponding interference graph, including creating two adjacent sub-ranges which are split on an edge between two basic building blocks that have similar execution frequencies;

profiling each sub-range based upon traversal of a basic building block of said control flow graph;

selecting frequently executed regions of code;

limiting a process of coalescing sub-ranges to said selected frequently executed regions of code based upon profiles thereby removing copies dividing initial live ranges into sub-ranges in said frequently executed regions; and selecting a set of sub-ranges in less used regions for spilling into memory, absent spilling any sub-ranges during the coloring phase and absent leaving any redundant sub-ranges to the coloring phase, wherein said sub-ranges are selected initially from those classified as significant-inactive and secondarily from those classified as significant-active.

6. A method for minimizing spill code in hot regions comprising:

splitting each live range of a variable into multiple sub-ranges on all edges leading to joint points and all edges coming from fork points in a control flow graph before coloring nodes in a corresponding interference graph;

analyzing a sub-range by assigning a category to said sub-ranges based upon activity of said sub-range across a saturation point, wherein said category is selected from a group consisting of: inactive, active, significant inactive, and significant active;

selecting frequently executed regions of code;

limiting a process of coalescing sub-ranges to said selected frequently executed regions of code based upon profiles thereby removing copies dividing initial live ranges into sub-ranges in said frequently executed regions and absent coalescing in regions other than said frequently executed regions; and selecting a set of sub-ranges in less used regions for spilling into memory, absent spilling any sub-ranges during the coloring phase and absent leaving any redundant sub-ranges to the coloring phase, wherein said sub-ranges are selected initially from those classified as significant-inactive and secondarily from those classified as significant-active.

\* \* \* \* \*